Figure 1:
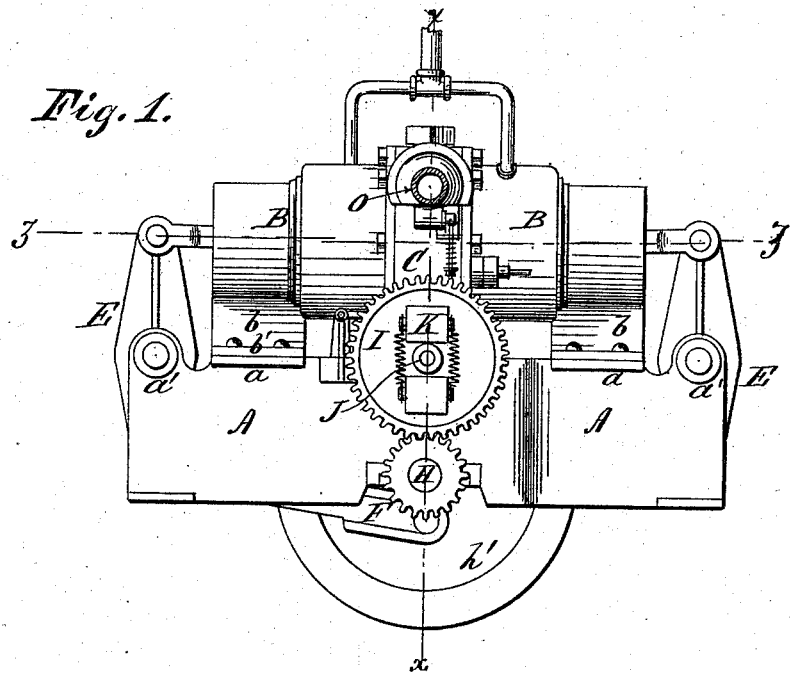

(No Model.) 6 Sheets—Sheet 1.

F. HIRSCH.
GAS ENGINE.

No. 530,523. Patented Dec. 11, 1894.

Witnesses:
D. W. Gardner
Daniel Nason

Inventor:
Feodor Hirsch.
By his Attorney,
George William Miatt (No Model.) 6 Sheets—Sheet 2.

F. HIRSCH.
GAS ENGINE.

No. 530,523. Patented Dec. 11, 1894.

Witnesses:
D. W. Gardner
Daniel Nason

Inventor:
Feodor Hirsch
By his Attorney
George William Miatt (No Model.)  
F. HIRSCH.  
GAS ENGINE.  
6 Sheets—Sheet 3.

No. 530,523.  Patented Dec. 11, 1894.

Witnesses:  
D. W. Gardner  
Daniel Nason

Inventor:  
Feodor Hirsch  
By his Attorney  
George William Miatt (No Model.) 6 Sheets—Sheet 4.

F. HIRSCH.
GAS ENGINE.

No. 530,523. Patented Dec. 11, 1894.

Witnesses:
D. W. Gardner
Daniel Nason

Inventor:
Feodor Hirsch
By his Attorney
George William Miatt (No Model.)  
F. HIRSCH.  
GAS ENGINE.  
No. 530,523.  
6 Sheets—Sheet 5.  
Patented Dec. 11, 1894.

Witnesses:  
O. W. Gardner.  
Daniel Nason.

Inventor:  
Feodor Hirsch  
By his Attorney  
George William Miatt (No Model.)  F. HIRSCH.  6 Sheets—Sheet 6.
GAS ENGINE.
No. 530,523.  Patented Dec. 11, 1894.
Fig. 11.  Fig. 12.
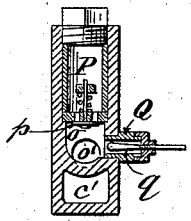
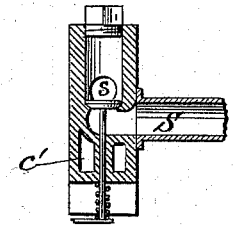
Fig. 13.  Fig. 14.  Fig. 15.
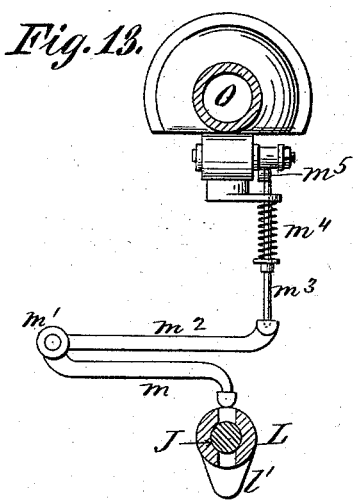
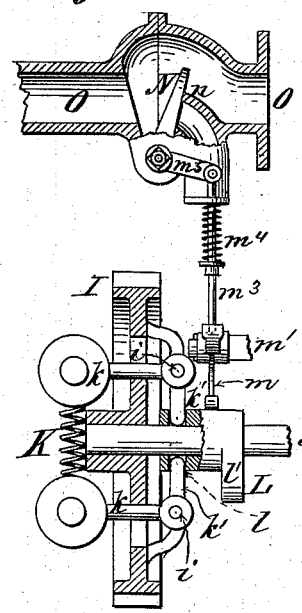
Witnesses:
R. W. Gardner
Daniel Nason
Inventor:
Feodor Hirsch
By his Attorney
George William Miatt

UNITED STATES PATENT OFFICE.

FEODOR HIRSCH, OF STEINWAY, NEW YORK.

GAS-ENGINE.

SPECIFICATION forming part of Letters Patent No. 530,523, dated December 11, 1894.

Application filed March 8, 1894. Serial No. 502,815. (No model.)

*To all whom it may concern:*

Be it known that I, FEODOR HIRSCH, a citizen of the United States, residing at Steinway, in the county of Queens and State of New York, have invented certain new and useful Improvements in Gas-Engines, of which the following is a description sufficient to enable others skilled in the art to which the invention appertains to make and use the same.
My invention is an improvement upon the form of gas engine set forth in my Patent No. 522,712, issued July 10, 1894, in which the pistons, connecting rods, rock shafts, pitmen, and cranks, are arranged in a central plane of action, coinciding with that of the longitudinal axis of the power cylinder. In said prior patent a triple wristed arrangement of cranks is resorted to, one of the pitmen is bifurcated, and the cranks webs are counter-weighted to balance the extra weight of the bifurcated pitmen. This renders the parts heavier than is desirable in small engines, especially those designed to be portable.
My present invention consists in the special construction and arrangement of parts herein described and claimed, whereby I obviate the above stated objection, and at the same time simplify and cheapen the construction of the engine as a whole. Thus I am enabled to dispense with one wrist-pin and web, with the bifurcation of one pitman, and the counterweighting of the webs to compensate therefor, lightening the engine and attaining a more perfect balance of parts and admitting of a higher speed with a given power, as well as simplifying and cheapening the construction without impairing the advantages attained by the use of opposed cylinders, pistons, &c., arranged in substantially the same plane of action. In the present case what may be designated as this common plane of action is coincident with the central plane of the comparatively thin web which connects the two cranks, wrist-pins, and the power cylinders are practically one and continuous; but there are important advantages in constructing the cylinders separately, and in joining them by a trunk or section. The difficulty and cost of boring the long single cylindrical interior surface are avoided; the parts are interchangeable and easily separated or replaced; and the central section or trunk portion also affords convenient means for arranging and constructing the inlet and discharge valves and passages in a simple and effective manner.

Figure 2:
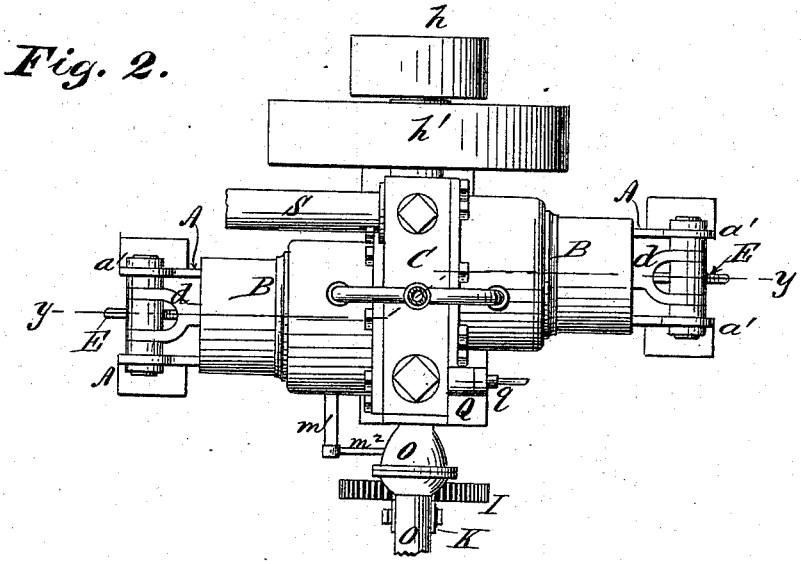
Figure 3:
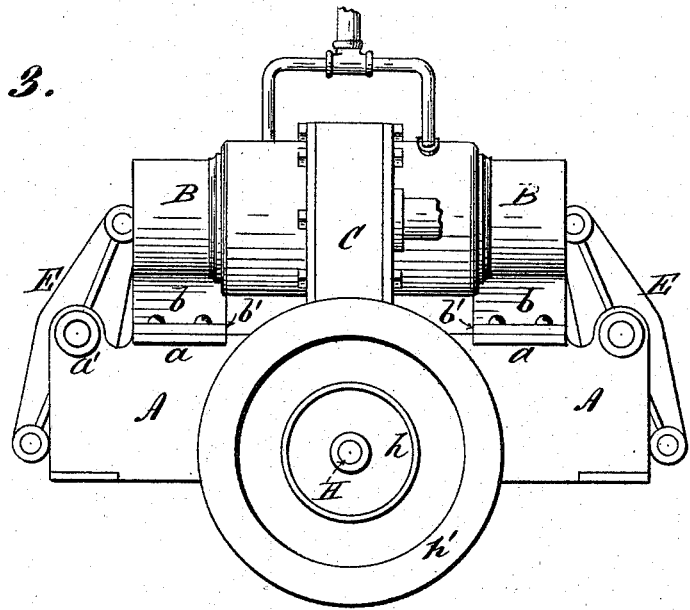
Figure 4:
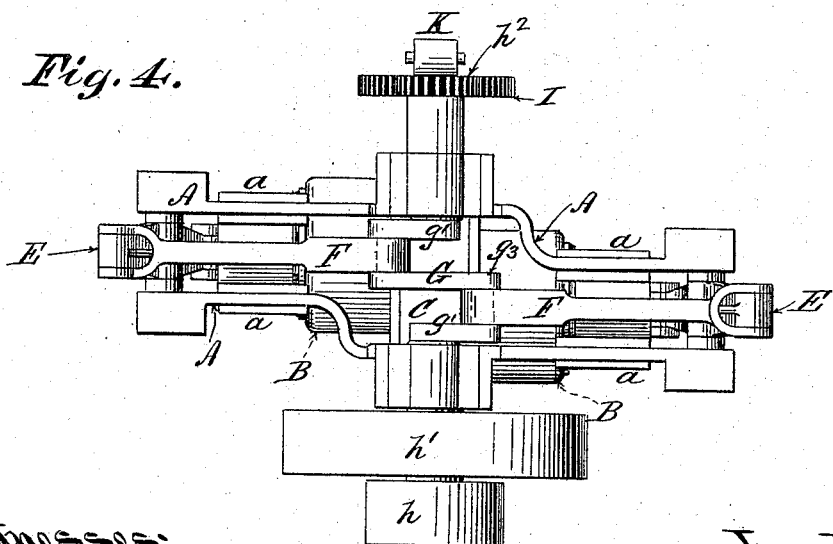
Figure 5:
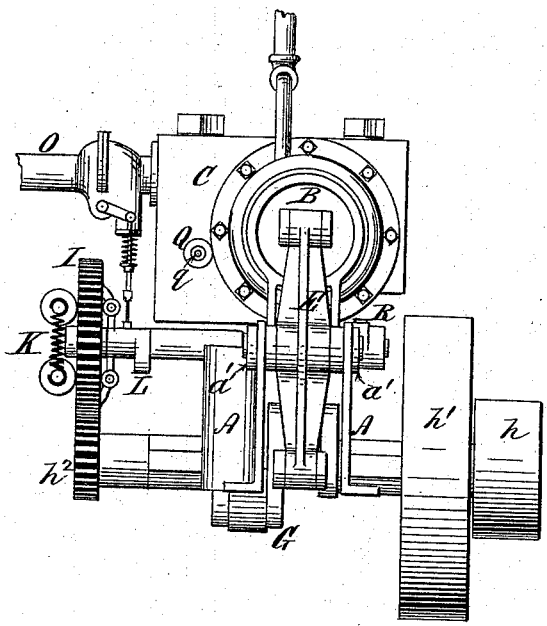
Figure 6:
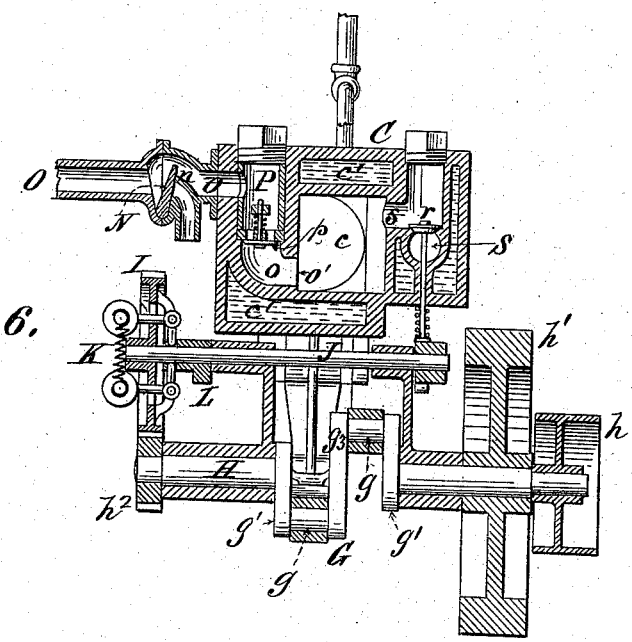
Figure 7:
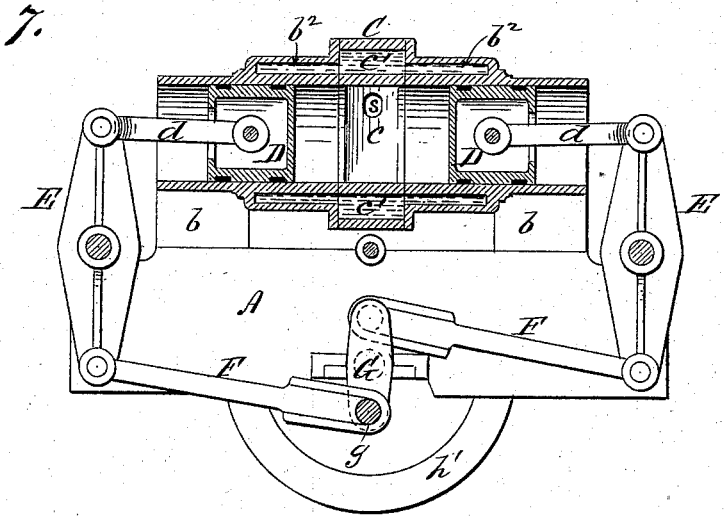
Figure 8:
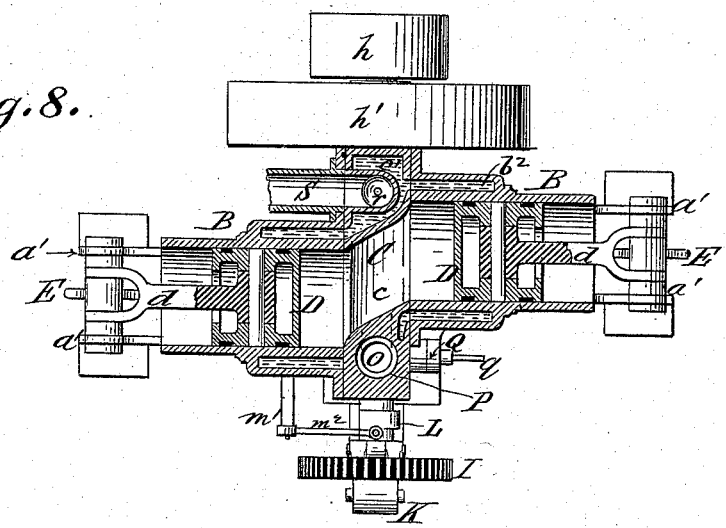
Figure 9:
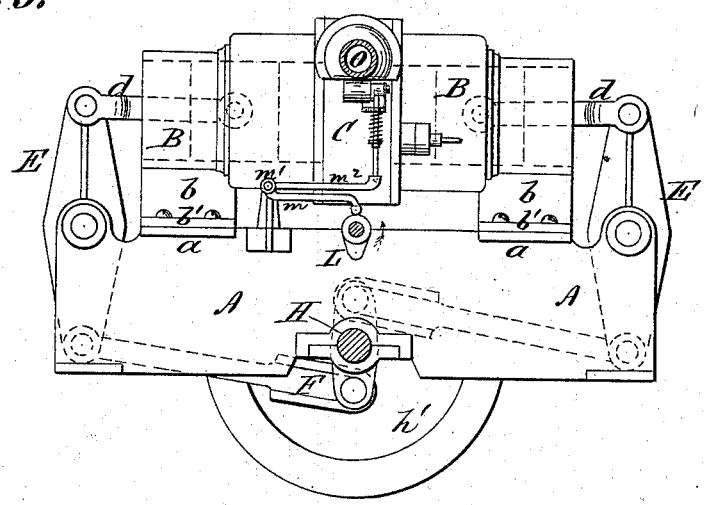
Figure 10:
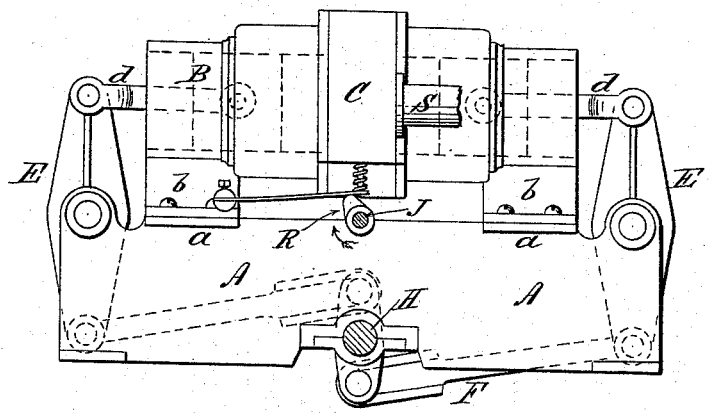

In the accompanying drawings Figure 1, is a front elevation of my improved engine; Fig. 2, a plan thereof; Fig. 3, a rear elevation;
Fig. 4, a view of the under side of the engine; Fig. 5, an end elevation; Fig. 6, a sectional elevation on plane of line *x*, *x*, Fig. 1; Fig. 7, a vertical longitudinal section taken upon plane of line *y*, *y*, Fig. 2; Fig. 8, a sectional view upon plane of line *z*, *z*, Fig. 1. Fig. 9, is an elevation of the engine with the gears removed to show the means employed for operating the relief valve. Fig. 10, is a similar view of the rear of the engine with the fly wheel and pulley removed, showing the cam for operating the exhaust valve. Fig. 11, is a section showing the inlet valve and igniter; Fig. 12, a section showing the exhaust valve. Fig. 13, is an enlarged view of the relief valve mechanism. Fig. 14, is an enlarged view, partly in section and partly in elevation taken at right angles to Fig. 13, and showing the connection of the governor with the relief valve cam arm mechanism.
Fig. 15, is a view showing the relative timing of the relief valve cam, and the exhaust cam.

The frame work A, consists of two vertical members, upon and between which the other parts are mounted. Brackets *a*, *a*, support the cylinders B, which are formed with the standards *b*, the flanges of which *b'*, are secured to the brackets *a*. The inner ends of the cylinders B, are secured to the central section or trunk C, the inner ends of the cylindrical chambers opening into the rectangular central chamber *c*. The longitudinal axes of the cylinders B, do not coincide, the difference being equal to that between the centers of the two pitmen connected with the crank, as will be seen by reference to Fig. 4. The difference in this alignment of the cylinders is compensated for by the central chamber *c*, in the trunk C, which chamber *c*, is either inclined as shown in Fig. 8, or is made of sufficient length and size to include both cylinder openings. The cylinders B, and the central trunk C, are provided with water jackets or chambers $c'$, $b^2$, communicating with each other and affording a circulation of cooling liquid in the usual manner.

Each cylinder B, is provided with a trunk piston D, which is directly connected in each case by a swinging piston rod $d$, to the upper end of a rock lever E, pivotally supported in bearings $a'$, at the ends of the frame A. The lower ends of the rock-levers E, are connected with the crank wrists $g$, of the duplex crank G, by pitmen F. The duplex crank G, interposed centrally in the shaft H, consists of the two side webs $g'$, $g'$, the wrists $g$, $g$, and the central web $g^3$, which connects said wrist pins. It will be noticed that the two cranks are divided or separated a distance apart equal only to this central web $g^3$, so that the centers of the pitmen F, rock-levers E, piston rods $d$, pistons D, and cylinders B, approximate each other. In fact as far as practical results are concerned they may be considered as situated and working in the same plane, the slight variation between the cylinders not affecting the results attained by my form of engine as set forth in my prior application hereinbefore referred to.

The power shaft H, is provided with the usual pulley $h$, and fly-wheel $h'$, at one end, and at the other or front end with the pinion $h^2$. This pinion $h^2$, meshes into a spur gear I, upon the front end of the cam shaft J, which extends above and parallel to the power-shaft H. The spur-wheel I, is twice the diameter of the pinion $h^2$, so that cam-shaft J, makes only one revolution to two of the power-shaft.

The gear I, is formed with the governor K, which controls the position of the relief-valve cam L. The governor K, consists of the weighted arms $k$, pivoted at $i$, to brackets upon the wheel I, and of smaller arms $k'$, which engage with recesses $l$, in the hub of the cam L. Thus when the speed of the engine exceeds a prescribed number of revolutions, the cam L, is drawn forward toward the wheel I, thereby bringing the eccentric portion of the cam $l'$, under the cam bearing arm $m$. The cam bearing arm $m$, is pivoted to a stationary part of the machine $m'$, and is formed with the arm $m^2$, so that it constitutes practically a rock-lever. The arm $m$, is made of comparatively thin elastic material, so that should it encounter the side of the eccentric portion $l'$, of the cam L, as the latter is drawn under it, it will yield sufficiently to prevent injury or delay until the continued rotation of the cam L, allows it to spring back into position, in line with the eccentric portion $l'$, which will then rock the lever $m$, $m^2$, upward. Seated in the end of the arm $m^2$, is a rod $m^3$, which is constantly pressed downward by the spring $m^4$. The upper end of the rod $m^3$, is connected to the crank arm $m^5$, by which the valve N, is opened or closed. When the lever $m$, $m^2$, is rocked upward by its eccentric portion $l'$, of the cam L, the rod $m^3$, is raised, thereby causing the crank $m^5$, to swing the valve N, forward away from the end of the air pipe $n$, which enters the gas and vapor supply pipe O, at this point. The supply pipe O, conveys to the valve chamber P, a suitable admixture of gas and air from a carburetor, mixer, or other available source,—the air pipe $n$, and the valve N, acting in an auxiliary capacity. It will thus be seen that when the speed of the engine increases beyond a prescribed degree, air will be admitted to the vapor supply pipe, to decrease the percentage of gas supplied to the engine. The supply pipe O, opens into the valve chamber P, in the trunk section C. Below the puppet valve $p$, is a chamber Q, opening into the supply passage $o$, which ends in the port $o'$. This chamber Q, contains the igniter $q$, which is represented as of the incandescent form set forth in Patent No. 518,717, of April 24, 1894, although I do not confine myself to any special form of igniter, since any suitable or well known device may be employed to effect the explosion of the gases.

At the rear end of the cam shaft J, is mounted the discharge cam R, by which the exhaust valve $r$, is raised at every second revolution of the power shaft H, permitting of the escape of the products of combustion through the port $s$, and discharge passage S.

What I claim as my invention, and desire to secure by Letters Patent, is—

1. In a gas engine the combination of two power cylinders axially out of line; a central trunk section having a chamber uniting the inner ends of said power cylinders and formed with a gas supply passage having an induction valve and an igniter, and with a discharge passage containing an exhaust valve operated intermittently and positively by a cam upon the cam shaft of the engine; trunk pistons in said power cylinders; two piston rods connecting said trunk pistons to rocking levers; said rocking levers; two pitmen connecting said rocking levers to radially opposed cranks upon a common power shaft; said power shaft formed with radially opposed cranks united by a single intermediate web; and a cam shaft for controlling the operation of the engine, geared to and rotated by the power shaft, substantially in the manner and for the purpose described.

2. In a gas engine the combination of two power cylinders axially out of line; a central trunk section having a chamber uniting the inner ends of said power cylinders and formed with a gas supply passage having an induction valve and an ignitor, and with a discharge passage containing an exhaust valve operated intermittently and positively by a cam upon the cam shaft of the engine; trunk pistons in said power cylinders; two piston rods connecting said trunk pistons to rocking levers; said rocking levers; two pitmen connecting said rocking levers to radially opposed cranks upon a common power shaft; said power shaft formed with radially opposed cranks united by a single intermediate web; a cam shaft for controlling the operation of the engine, geared to and rotated by the power shaft; an air valve interposed in the gas supply conduit; and a governor on the cam shaft arranged to operate said air valve, substantially in the manner and for the purpose described.

3. In a gas engine the combination of an air valve interposed in the gas inlet passage, mechanism for operating said air valve provided with a laterally flexible cam lever, a laterally adjustable cam for engaging with said cam lever, and an automatic governor for controlling the position of the said cam with relation to the said cam lever, substantially in the manner and for the purpose described.

FEODOR HIRSCH.

Witnesses:
GEORGE WILLIAM MIATT,
D. W. GARDNER.